(12) United States Patent
Glukhovsky

(10) Patent No.: US 7,161,164 B2
(45) Date of Patent: Jan. 9, 2007

(54) DEVICE AND METHOD FOR ATTENUATING RADIATION FROM IN VIVO ELECTRICAL DEVICES

(75) Inventor: Arkady Glukhovsky, Nesher (IL)

(73) Assignee: Given Imaging Ltd., Yoqneam (IL)

( * ) Notice: Subject to any disclaimer, the term of this patent is extended or adjusted under 35 U.S.C. 154(b) by 121 days.

(21) Appl. No.: 10/187,795

(22) Filed: Jul. 3, 2002

(65) Prior Publication Data
US 2003/0013370 A1    Jan. 16, 2003

Related U.S. Application Data

(60) Provisional application No. 60/302,672, filed on Jul. 5, 2001.

(51) Int. Cl.
  G21F 3/02       (2006.01)
  A61N 5/02       (2006.01)
  A41D 13/015    (2006.01)
  B32B 27/04     (2006.01)

(52) U.S. Cl. ............... 250/516.1; 600/1; 600/2; 600/3; 600/12; 600/15; 2/455; 2/46; 442/117; 442/131

(58) Field of Classification Search ......... 428/144, 428/148, 172, 432, 450; 442/117, 131; 600/1–3, 600/12, 15; 2/46, 455; 250/516.1
See application file for complete search history.

(56) References Cited

U.S. PATENT DOCUMENTS

| 4,278,077 A | 7/1981 | Mizumoto |
| 5,604,531 A * | 2/1997 | Iddan et al. ............. 348/76 |
| 6,240,312 B1 | 5/2001 | Alfano et al. |
| 6,603,981 B1 * | 8/2003 | Carillo et al. ............ 455/128 |
| 6,738,265 B1 * | 5/2004 | Svarfvar et al. .......... 361/818 |

FOREIGN PATENT DOCUMENTS

WO    WO 01/65995    9/2001

OTHER PUBLICATIONS

The EMF Safety Superstore, EMF Shielding Fabrics.
Simulated Biological Materials for Electromagnetic Radiation Absorption studies, G. Hartsgrove, A. Kraszewski and A. Surowiec. Bioelectromagnetics 8:29-36 1987.

* cited by examiner

*Primary Examiner*—Terrel Morris
*Assistant Examiner*—Lynda Salvatore
(74) *Attorney, Agent, or Firm*—Pearl Cohen Zedek Latzer, LLP

(57) ABSTRACT

A garment and method for reducing electromagnetic radiation produced by a transmitting device typically located inside a body. The garment may include material to prevent or lower electromagnetic radiation. A method for using such a garment to lower electromagnetic emissions is described.

8 Claims, 5 Drawing Sheets

DEVICE AND METHOD FOR ATTENUATING RADIATION FROM IN VIVO ELECTRICAL DEVICES

PRIOR PROVISIONAL APPLICATION

The present application claims benefit from prior provisional application No. 60/302,672 entitled "ATTENUATING RADIATION FROM IN VIVO ELECTRICAL DEVICES" and filed on Jul. 5, 2001.

FIELD OF THE INVENTION

The present invention relates to a system and method of attenuating electromagnetic radiation from electrical and electronic in vivo devices.

BACKGROUND OF THE INVENTION

Certain medical treatments, therapies or diagnostic procedures call for the implantation, insertion, ingestion or attachment of an electrical or electronic device (hereinafter, collectively an electrical device) into the bodies of the subjects of such treatments, therapies or diagnostic procedures. Certain electrical devices emit electromagnetic radiation either as a by-product of their designated function or as part of the transmission by such electrical devices of data, images or other information to antennas or other data collection units outside the body (such external units may be referred to as external collection units).

Emission of electromagnetic radiation is subject to various controls and regulations by government or regulatory bodies, including by regulatory bodies charged with monitoring and allocating broadcasting spectrums. Among these regulations are prohibitions on devices whose emissions of electromagnetic radiation or whose creation of electromagnetic fields could interfere with regulated broadcast signals. For example, the United States Federal Communications Commission currently promulgates regulations that restrict the distribution or sale of devices whose emissions of electromagnetic radiation into the surrounding environment are in excess of 46 dB(µV/m) measured at distance of 3 m, per FCC regulations part 15, in 432–434 MHz part of the spectrum.

Certain electrical devices produce or rely on emissions of electromagnetic radiation that exceed the emission levels permitted under applicable government regulations. While reducing electromagnetic radiation emissions from these electrical devices could be possible, such reduction may impair the function of the electrical device or the capacity of external collection units to receive the signals transmitted by the electrical devices.

Therefore, there exists a need to reduce the effects or emissions of electromagnetic radiation without impairing the functionality or effectiveness of the source of such radiation.

SUMMARY OF THE INVENTION

Embodiments of the present invention lower the amount of electromagnetic radiation emitted from in vivo electrical devices which reaches the environment external to the body and/or outside of or beyond an external collection units.

When used herein the term environment external to the body means the area outside of or beyond the external surface area of the body and its immediate vicinity.

When used herein, electrical devices means any therapeutic, diagnostic or imaging device that is implanted, inserted, ingested within or otherwise attached to the body, including but not limited to, devices such as in vivo imaging devices, for example swallowable capsules for imaging the gastrointestinal (GI) tract, pacemakers, heart regulators, fetal monitors, insulin or hormone control apparatuses.

An external collection unit may include any receiver of electrical or electronic signals from the electrical device or otherwise from systems associated therewith that is worn, carried or attached in close proximity to the body, including but not limited to antennas, antenna arrays, sensors, recorders and electrical or electronic data collectors such as that used with a swallowable capsule for imaging the gastrointestinal tract.

The term electromagnetic radiation may include any electrical or electromagnetic radiation, including but not limited to, electromagnetic fields and electromagnetic waves.

Embodiments of the invention provide a method and system for attenuating electromagnetic radiation emitted by in vivo electrical devices from reaching the environment external to the body and/or external to an external collection unit. In accordance with an embodiment of the present invention, a portion of the body of a patient into which an electrical device has been implanted, inserted, ingested or attached, is fitted with a garment which may be fashioned in the form of any or all of a shield, patch, belt, apron, vest or girdle, or other similar item, either flexible or rigid (referred to as the garment).

In various embodiments, the garment contains a shielding layer made of a conductive material such as a metallic foil or such as a fabric or mesh whose fibers are made of or impregnated with metallic particles such as, for example, tin and copper and, possibly, coated with a conductive material such as conductive acrylic or other conductive material. The garment may include other electrically conductive material, such as flexible or rigid metal plates or sheets including, for example, aluminum foil. Given that, in one embodiment, the wavelength of the electromagnetic radiation is of the order of several centimeters, the distance between the metallic elements should be less than a few millimeters; for example, less than two millimeters. Of course, other wavelengths and distances can be used. In the case of the mesh, the distance between the metallic elements in the mesh is typically smaller than the wavelength of the emitted electromagnetic radiation so that the garment creates the effect of a Faraday cage in respect of the electromagnetic radiation emitted by the electrical device.

The garment is worn on the outside of the body, typically covering the area of the body corresponding to the location of the in vivo electrical device that emits electromagnetic radiation. The shielding layer in the garment attenuates the electromagnetic radiation emitted by the electrical device, which is radiated into the environment external to the body or its vicinity. In some embodiments, the garment includes a holder or strap, typically on its inner side, for an external collection unit in a position typically corresponding to the location of the in vivo electrical device in the body, thereby permitting the external collection unit to be exposed to the electromagnetic radiation emitted by the electrical device without interference from the shielding layer in the garment.

The invention further provides a method for complying with regulations relating to electromagnetic radiation emissions into the environment external to the body. The method comprises the step of providing a patient who has an in vivo electromagnetic device with a garment in accordance with the invention.

DETAILED DESCRIPTION OF THE INVENTION

In the following description, various aspects of the present invention will be described. For purposes of explanation, specific configurations and details are set forth in order to provide a thorough understanding of the present invention. However, it will be apparent to one skilled in the art that the present invention may be practiced without the specific details presented herein. Furthermore, well-known features may be omitted or simplified in order not to obscure the present invention.

Embodiments of the present invention relate to a system and method of attenuating the amount of electromagnetic radiation from in vivo electrical devices which reach the environment external to the body and/or external collection units.

In accordance with an embodiment of the present invention, the body into or onto which an electrical device has been implanted, inserted, ingested or attached is fitted with a garment containing a shielding layer comprising a conductive material or fibers (typically non-conductive fibers such as nylon, cotton, etc.) that are plated or impregnated with a conductive material, for example, metallic particles such as tin and copper or other electrically conductive material and, possibly, coated with a conductive material such as acrylic. An alternative embodiment may use a metallic foil such as aluminum foil in the shielding layer.

An example of a material that can be used in the shielding layer for the garment is Shieldex®Supra brand fabric sold by Less EMF Inc, which includes plain-weave nylon plated with tin and copper and coated with conductive acrylic. In an embodiment of the invention using a metallic foil such as aluminum foil in the shielding layer, the electromagnetic radiation is attenuated along the surface of the shielding layer. In the embodiment of the invention using fibers plated or impregnated with metallic particles, the distance between the particles is typically smaller than wavelength of the electromagnetic radiation emitted by the electrical device to achieve the effect of a Faraday cage in respect of the electromagnetic radiation emitted by the electrical device.

The garment containing the shielding layer is worn on the outside of the body, typically corresponding to the location of the electrical device from which electromagnetic radiation is emitted. The shielding layer of the garment attenuates the electromagnetic radiation emitted from the electrical device, which escapes into the environment external to the body or its vicinity.

Figure 1:
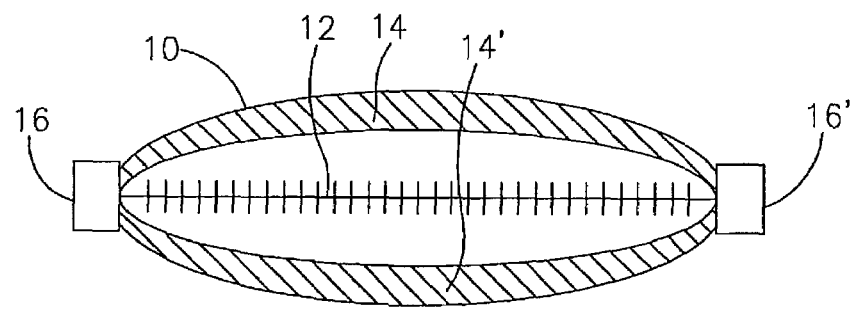
FIG. 1 is a schematic longitudinal cross section of a garment according to an embodiment of the invention.

Reference is now made to FIG. 1, which is a schematic presentation of the garment containing a shielding layer, according to an embodiment of the invention. The garment 10 comprises an internal layer 12, which is, in one embodiment, a sheet of shielding layer made of conducting material, which is typically surrounded by inside and outside layers of fabric 14 and 14' respectively. The internal layer 12 of the shielding layer may be attached or secured to layers 14 and/or 14', or may simply be placed within the layers. The inside and outside layers of fabric 14 and 14' cover the internal layer 12 of the shielding layer and prevent contact with the body, support and protect the internal layer 12 of the shielding layer from damage and from slipping away from the portions of the body to be covered, and can accommodate decorative features or colors to make garment 10 more attractive. According to other embodiments one or more layers of fabric may be used with a shielding layer adjacent to one or more fabric layers. The fabric layer may be closest to a subject's body or, optionally the shielding layer may be closest to the subject's body whereas the layer of fabric coats the shielding layer from the outside.

The area of the internal layer 12 of the shielding layer is typically approximately congruous with the area of the garment 10 such that the surface of the body that is covered by garment 10 is also covered by the internal layer 12 of the shielding layer. Garment 10 may be fitted with fasteners 16 and 16' such as clips, laces or Velcro straps to hold it in place against the body. The garment 10 typically surrounds at least a portion of the body.

In alternate embodiments, layers 14 and/or 14' need not be used or may be integral with a conducting layer. Furthermore, the internal layer 12 need not substantially contiguous with layers 14 and/or 14', but instead may be placed where needed.

Figure 2A:
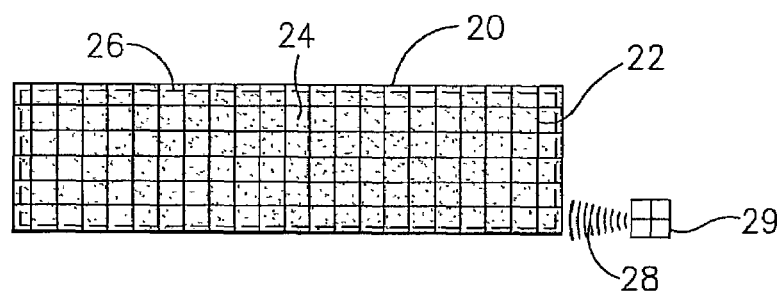
FIG. 2A is a schematic diagram of conducting materials used with an embodiment of the invention.
Figure 2B:
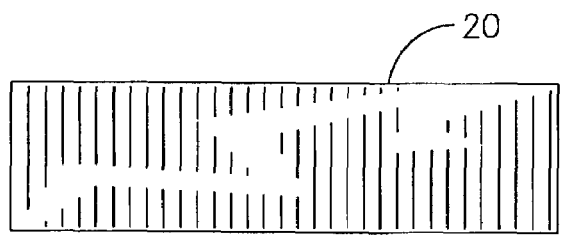
FIG. 2B describes an embodiment of the invention using a metallic foil.

FIG. 2A schematically illustrates the composition of a sheet of shielding layer according to an embodiment of the present invention. Shielding layer 20 includes fibers 22 which are impregnated or coated with conducting elements, such as metallic particles 24 and covered with a conductive coating 26 creating the effect of a Faraday cage to attenuate the electromagnetic radiation emitted by electrical device 29. The fibers may be, for example, nylon, cotton, or any appropriate substance. The distance between the conducting elements or fibers 22 of the shielding material 20 is typically smaller than the wavelength of electromagnetic radiation 28 emitted by electrical device 29. Given that, in one embodiment, the wavelength of the electromagnetic radiation is on the order of several centimeters, the distance between the conducting (e.g., metallic) elements should be less than a few millimeters; for example, less than two millimeters. Of course, other wavelengths and distances can be used. Alternately, some or all of the fibers 22 may be conductive—for example, a weave made of or including copper, tin, or any other suitable material may be used. FIG. 2B schematically illustrates an alternative embodiment of this invention in which a metallic foil such as aluminum foil is used as the conducting material in shielding layer 20.

Figure 3A:
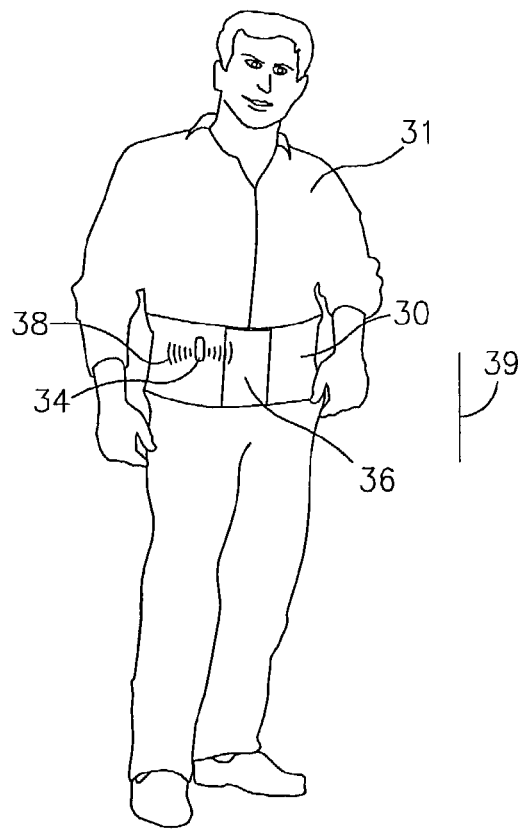
FIG. 3A is a schematic side view illustration of a subject wearing a garment in accordance with an embodiment of the invention.

FIG. 3A schematically illustrates a view of a body 31 fitted with a garment 30 according to an embodiment of the invention. The garment 30 is in the form of a belt containing a shielding layer, and is worn on a body 31 into or onto which an electrical device 34 has been implanted, inserted, ingested or attached. Garment 30 containing a shielding layer is worn on the surface of the body 31 corresponding to the location in the body 31 wherein electrical device 34 is found. Garment 30 may be held in place or supported on the body 31 by, for example, fasteners 36 in the form of Velcro straps or laces. Other fastening elements may be used, and other shapes, such as a vest or girdle may be used. The shielding layer in garment 30 blocks or lessens the electromagnetic radiation 38 being emitted by electrical device 34 reaching the environment 39 external to the body 31.

Figure 3B:
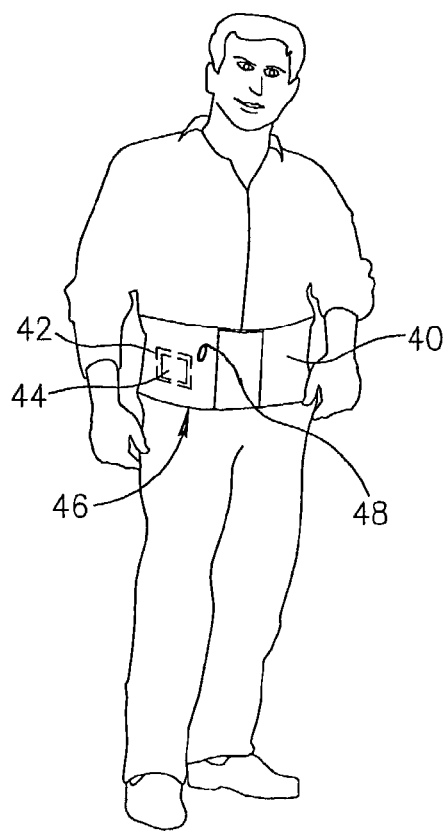
FIG. 3B is a schematic illustration of a garment in accordance with an embodiment of the invention which holds an external collection unit.

FIG. 3B illustrates garment 40 according to an embodiment of the invention. Garment 40 includes a holder 42 fashioned out of, for example, fabric into which an external collection unit 44 may be inserted and held against the body. The position of external collection unit 44 as it is held between the body and shielding layer 46 of garment 40 permits external collection unit 44 to receive the signals emitted from electrical device 48. Other holding units or methods may be used, and the collection unit 44 may be held in other suitable positions.

Figure 5:
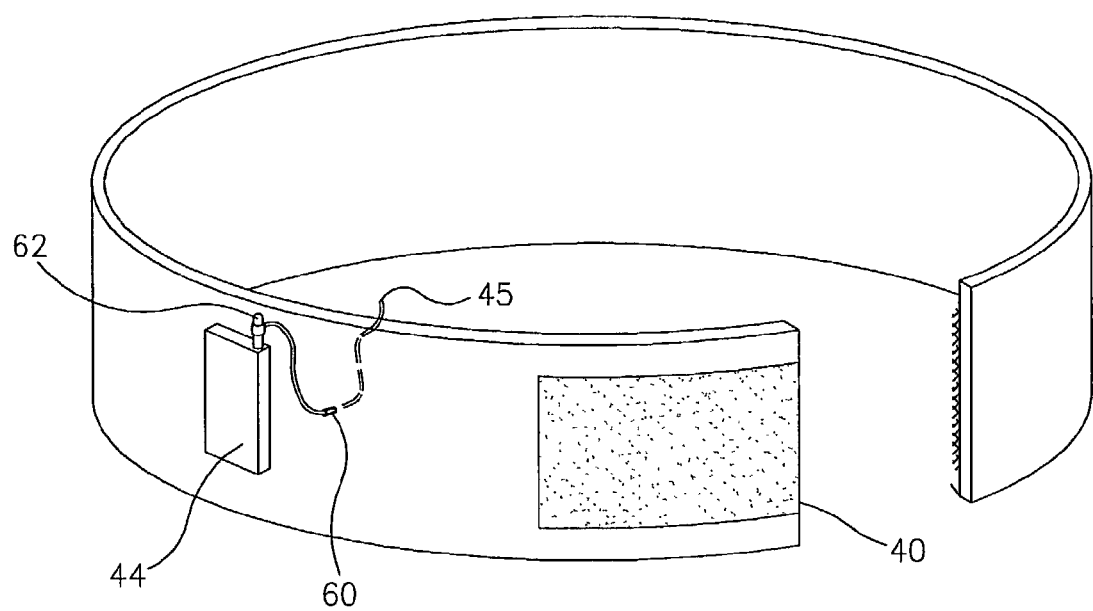
FIG. 5 depicts a garment according to one embodiment of the invention.

Typically, only the antenna of the receiving unit needs to be exposed to the electromagnetic radiation; the receiving unit need not be so exposed. FIG. 5 depicts a garment according to one embodiment of the invention. In one embodiment, an antenna 45 of the collection unit 44 is positioned between the garment 40 and the body, and the collection unit 44 may be on the outside of the garment 44. The collection unit 44 may access the antenna 45 via, for example, a hole 60 in the garment 40. Wires 62 may attach the collection unit 44 and the antenna 45. The hole 60 may simply be an opening or may include, for example, a jack or connector (such as a coaxial jack) allowing connection of the antenna 45 to the collection unit 44. The collection unit may be held to the outside of the garment 40 by, for example, straps, Velcro, or other suitable connectors, or, alternately, need not be attached to the garment 40. The antenna 45 may be held to the inside of the garment 40 by, for example, straps, Velcro, or other suitable connectors. The connection between the antenna 45 and the collection unit 44 may be in other manners; for example a wire that bypasses or goes around the garment 40.

In one embodiment of the invention the electrical device 34 is an autonomous in vivo imaging device for imaging the GI tract, which transmits image data to an external collection unit, such as an antenna array. Embodiments of such a device and receiving systems are described in WO 01/65995 to Glukhovsky et al. and in U.S. Pat. No. 5,604,531 to Iddan. Other electromagnetic radiation producing devices may be used with the system and method of the present invention.

Figure 4A:
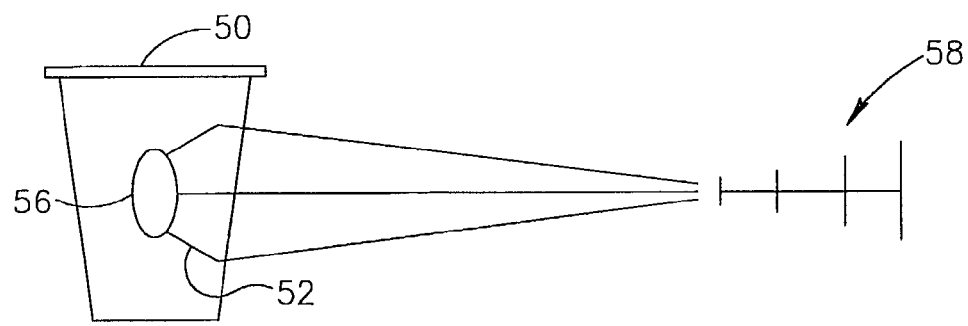
FIGS. 4A, 4B and 4C are schematic illustrations of the study of the present invention as described below.
Figure 4B:
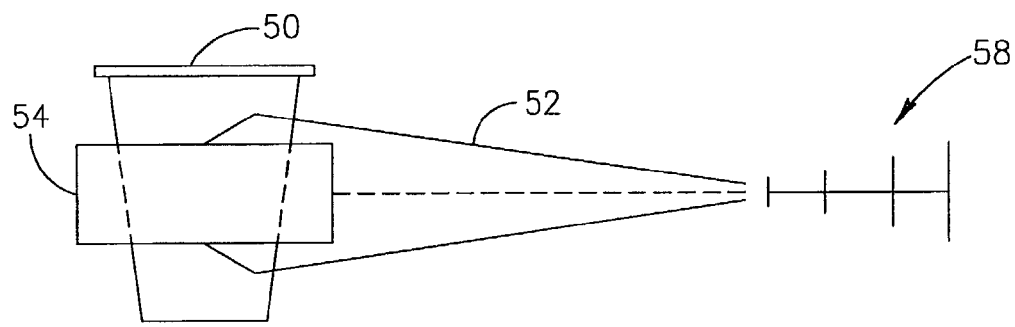
Figure 4C:
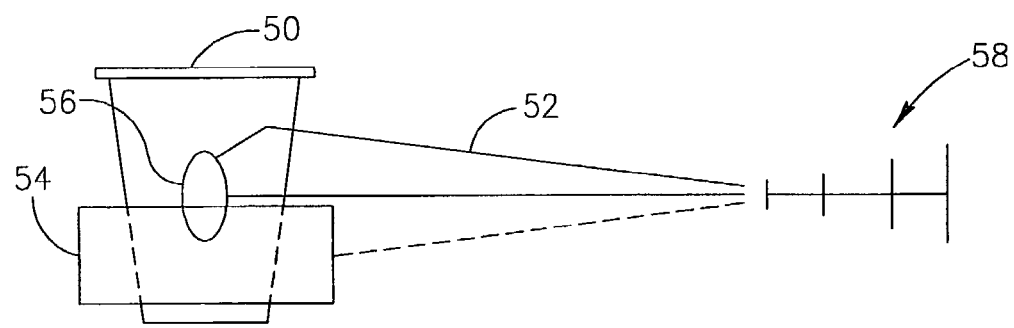

FIGS. 4A, 4B and 4C illustrate a study of the present invention that was conducted to determine the effects of a garment on the electromagnetic radiation emitted by a GI imaging device 56 (similar to that described in WO 01/65995 or in U.S. Pat. No. 5,604,531 to Iddan) into the environment external to the body. The methods and systems used in the studies described herein are meant to be illustrative only, and are not limiting.

As part of the study, a phantom 50 was prepared to simulate the propagation of the electromagnetic radiation 52 in the body tissues. The phantom 50 was prepared based on the "Simulated Biological Materials for Electromagnetic Radiation Absorption Studies" (G. Hartsgrove, A. Kraszewski, and A. Surowiec, Bioelectromagnetics 8:29–36, 1987). The phantom 50 had the shape of a bucket, and measurements were performed for the same GI imaging device 56 in the open air and in the phantom. Measuring antenna 58 was located at distance of 3 meters from the phantom 50.

A garment 54 in the form of a belt was placed on the phantom 50 at different heights as shown in FIGS. 4B and 4C. The use of the garment 54 resulted in the attenuation of the electromagnetic radiation 52 emitted by the GI imaging device 56 by a differential of 7–10 dB below the levels where no garment was worn. The highest measurement appears in the Table below. Of course, other attenuation levels may be achieved.

Measurements with the phantom can be therefore summarized:

| Type of measurement | Measurement [dB (μV/m)] | Margin relative to 46 dB (μV/m) FCC limit |
|---|---|---|
| Open air | 54.7 | −8.7 |
| Inside phantom | 39.1 | 6.9 |
| Inside phantom with Recorder belt | 32.1 | 13.9 |

In FIG. 4A the GI Imaging device 56 is immersed in the phantom 50. Measurements of the emitted electromagnetic radiation 52 without a garment 50 in FIG. 4A are shown as solid lines. As the garment 54 is fitted over the phantom 50 in FIGS. 4B and 4C at varying heights, some of the electromagnetic radiation is attenuated, shown as dotted lines.

Figure 6:
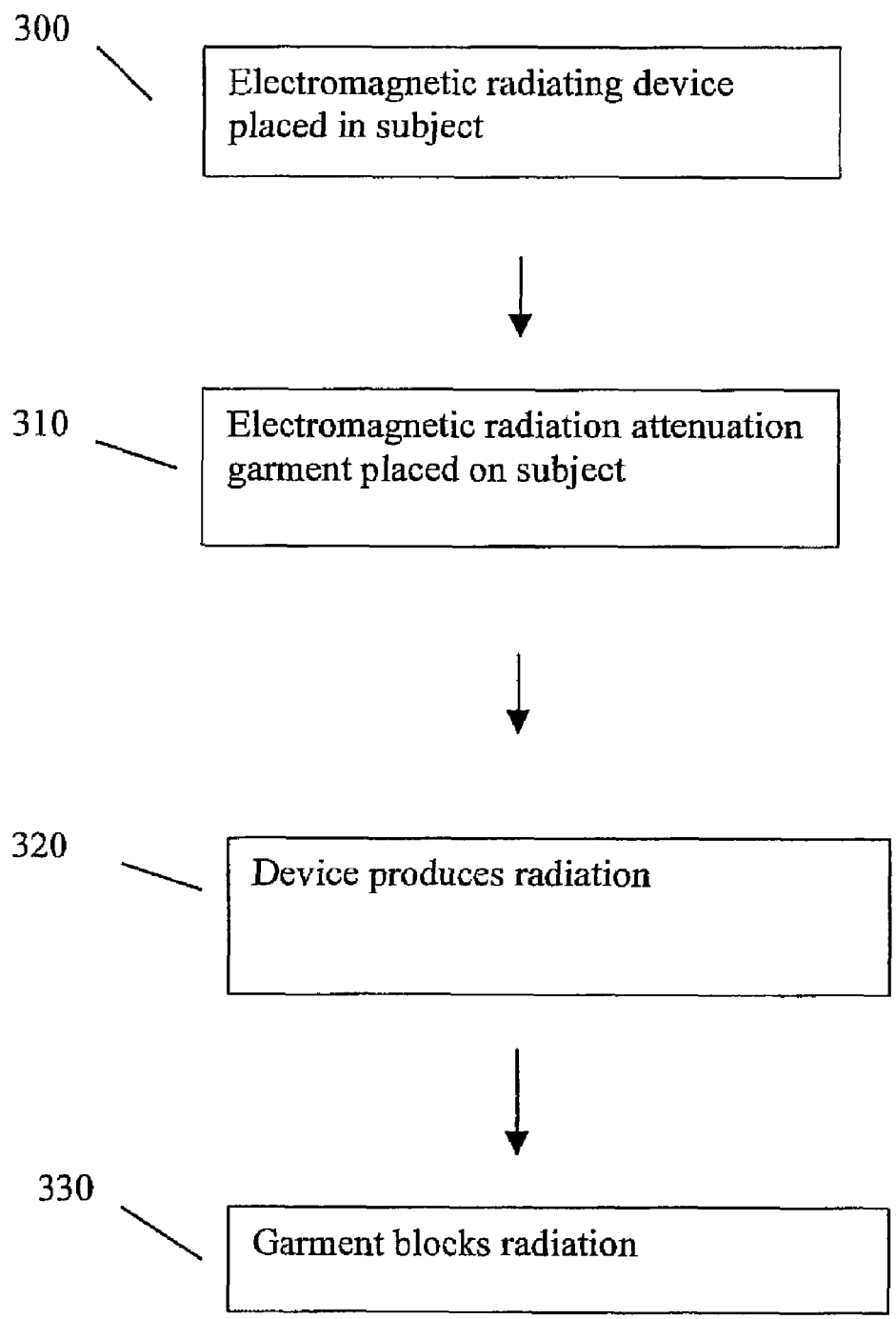
FIG. 6 depicts a series of steps according to an embodiment of the present invention.

FIG. 6 depicts a series of steps according to an embodiment of the present invention.

Referring to FIG. 6, in step 300, an electromagnetic radiation producing device is implanted within, ingested by, or otherwise placed inside a subject.

In step 310, an electromagnetic radiation attenuation garment is placed on a portion of the subject.

In step 320, the electromagnetic radiation producing device produces radiation by operating a transmitting device so that it produces electromagnetic radiation.

In step 330, the electromagnetic radiation attenuation garment blocks all or part of the electromagnetic radiation produced.

In other embodiments, other steps or series of steps may be used.

While various embodiments of the present invention have been described, so as to enable one of skill in the art to practice the present invention, the preceding description is intended to be exemplary only. It should not be used to limit the scope of the invention, which should be determined by reference to the following claims.

The invention claimed is:

1. A method of attenuating electromagnetic radiation produced by an electrical or electronic in-vivo device ingested in a body, the method comprising:
   providing a garment comprising an electromagnetic radiation attenuating layer;
   providing an antenna array;
   operating the ingested in-vivo device to produce electromagnetic radiation; and
   at least partially surrounding the body with the antenna array and the garment such that the radiation produced by the ingested in-vivo device is at least partially attenuated by the garment; and such that the antenna array is positioned between the body and the garment.

2. The method of claim 1, wherein the garment includes at least a sheet of conductive material.

3. The method of claim 2, wherein the sheet includes aluminum.

4. The method of claim 1, wherein the garment includes at least conductive fibers.

5. The method of claim 4 wherein the fibers are impregnated with conductive material.

6. The method of claim 1 wherein the garment includes at least one fabric layer, wherein the electromagnetic radiation attenuating layer is disposed adjacent to the at least one fabric layer.

7. The method of claim 1, wherein the antenna array is positioned on the inside of the garment, and wherein a collection unit is attached to the antenna array via a hole in the garment.

8. The method of claim 1, wherein the in-vivo device is a swallowable capsule for imaging the gastrointestinal tract.

* * * * *